(12) United States Patent
Edwards et al.

(10) Patent No.: US 7,417,395 B2
(45) Date of Patent: Aug. 26, 2008

(54) SWITCH-BASED DOOR AND RAMP INTERFACE SYSTEM

(75) Inventors: Paul Edwards, Durango, CO (US); Wade Nelson, Durango, CO (US); Greg Berthelot, Farmington, NM (US)

(73) Assignee: The Braun Corporation, Winamac, IN (US)

( * ) Notice: Subject to any disclaimer, the term of this patent is extended or adjusted under 35 U.S.C. 154(b) by 28 days.

(21) Appl. No.: 11/436,458

(22) Filed: May 18, 2006

(65) Prior Publication Data

US 2007/0267992 A1 Nov. 22, 2007

(51) Int. Cl.
*H02P 1/00* (2006.01)
*B62B 1/06* (2006.01)

(52) U.S. Cl. .................. 318/445; 318/468; 318/432; 318/282; 318/286; 318/454; 318/537; 318/540; 318/541

(58) Field of Classification Search ......... 318/280–286, 318/432, 460–468, 445; 414/537, 454, 462, 414/540, 541, 457; 307/10.1; 49/280, 360
See application file for complete search history.

(56) References Cited

U.S. PATENT DOCUMENTS

| | | | |
|---|---|---|---|
| 3,651,965 A | | 3/1972 | Simonelli et al. |
| 3,874,527 A | * | 4/1975 | Royce .................. 414/537 |
| 4,164,292 A | | 8/1979 | Karkau |
| 4,176,999 A | * | 12/1979 | Thorley ................ 414/540 |
| 4,251,179 A | | 2/1981 | Thorley |
| 4,325,668 A | | 4/1982 | Julian et al. |
| 5,140,316 A | | 8/1992 | DeLand et al. |
| 5,180,275 A | * | 1/1993 | Czech et al. ............. 414/541 |
| 5,293,632 A | | 3/1994 | Novakovich et al. |
| 5,305,355 A | | 4/1994 | Go et al. |
| 5,308,214 A | * | 5/1994 | Crain et al. ............. 414/541 |
| 5,350,986 A | * | 9/1994 | Long et al. ............. 318/432 |
| 5,389,920 A | | 2/1995 | DeLand et al. |
| 5,391,041 A | * | 2/1995 | Stanbury et al. ......... 414/537 |
| 5,396,158 A | * | 3/1995 | Long et al. ............. 318/282 |
| 5,434,487 A | * | 7/1995 | Long et al. ............. 318/286 |
| 5,697,048 A | | 12/1997 | Kimura |
| 5,737,335 A | | 4/1998 | Mizuta et al. |

(Continued)

OTHER PUBLICATIONS

"The 1999 Ford Windstar," *VMI Voice Technical Edition*, Publication, (Apr. 1999).

(Continued)

*Primary Examiner*—Paul Ip
(74) *Attorney, Agent, or Firm*—Michael Best & Friedrich LLP

(57) ABSTRACT

An interface system is presented, which prevents operational interference between a vehicle power door and a ramp of an access system by interrupting power to the motors and actuators responsible for operating the door. The interface system includes a relay system that does not interrupt, read, signal, or otherwise interfere with the communication lines between a body control unit, door control unit, or remote control transmitter or receiver. Thus, the interface system functions without the need to receive and transmit signals on the vehicle's communication bus. The interface system enables the ramp controller of the access system to be a separate module, which controls the ramp and kneel functions, because the only input the ramp controller provides to the power door system is to a ground signal that mimics that of a switch included in the vehicle.

26 Claims, 2 Drawing Sheets

U.S. PATENT DOCUMENTS

| | | | |
|---|---|---|---|
| 5,825,098 | A | 10/1998 | Darby et al. |
| 5,835,873 | A | 11/1998 | Darby et al. |
| 5,979,114 | A | 11/1999 | Clark et al. |
| 6,028,537 | A | 2/2000 | Suman et al. |
| 6,075,460 | A | 6/2000 | Minissale et al. |
| 6,275,167 | B1 | 8/2001 | Dombrowski et al. |
| 6,300,879 | B1 | 10/2001 | Regan et al. |
| 6,302,439 | B1 | 10/2001 | McCurdy |
| 6,515,377 | B1 * | 2/2003 | Ubelein et al. ............. 307/10.1 |
| 6,825,628 | B2 * | 11/2004 | Heigl et al. ................. 318/468 |
| 2003/0007851 | A1 * | 1/2003 | Heigl et al. ................. 414/454 |
| 2003/0044266 | A1 * | 3/2003 | Vandillen et al. ............ 414/537 |

OTHER PUBLICATIONS

"Activan Accessibility with Style. Conversion of General Motors Minivans," Service Manual, (Dec. 9, 1999), *Published by Ricon Corporation*.

"Braun Entervan," Brochure, (2001), *Published by The Braun Corporation*.

"Entervan, the Braun Corporation," Series 03 and later Fully-Automatic 1996 and newer Chrysler Entervan II, Owner's/Service Manual, (Revision Aug. 1998), 5230096-03.

Holicky, Richard, "Big Vans, Minivans Pros and Cons," *New Mobility Magazine*, (Jun. 1997).

"Honda Odyssey Minivan Conversion," Owner's Manual, (Oct. 2006), *Published by VMI*.

"New Ramp & Electrical Systems on All Power Rampvans," www.ims-vans.com/RampElectrical.htm, (May 12, 1999).

"Odyssey 2005-2006 Electrical Troubleshooting," Manual, (Mar. 2006), *Published by American Honda Motor Co., Inc.*

"Automotive: Serial Communication," Installation Guide Model MPC01 Multi-Purpose Controller, (1998), *Published by Whelan Engineering Company Inc.*, Chester, CT.

"Automotive: Serial Communication," Operating Guide MPC01 Multi-Purpose Controller, (1995), *Published by Whelan Engineering Company Inc.*, Chester, CT.

Sunderlin, Ann, "Van-Tastic, How'd They Do That," (Nov. 1995), *Paraplegia News Magazine*.

"Wheels 2000 and Beyond," *New Mobility Magazine*, p. 48, publicly available prior to Jan. 1, 2002.

"VMI-4 Ford Windstar Factory Door Lockout Relay Pack," "Operational Characteristics of the VMI-4 Module," *Technical Service Manual*, (Mar. 9, 2000).

* cited by examiner

SWITCH-BASED DOOR AND RAMP INTERFACE SYSTEM

BACKGROUND

Access systems, such as motorized lifts, have been used to transport people and cargo. These access systems include platforms, ramps, moving seats, movable steps, and the like, which may be attached to stationary structures, such as buildings and loading docks, or mobile structures such as vehicles. Access systems have been used to provide disabled individuals access to structures that traditionally were accessible only via steps or stairs, or required an individual to step over or across an obstacle. For example, motorized lifts have been used to allow disabled individuals to enter and exit vehicles. In another example, motorized lifts have been used to load and/or unload stretchers from vehicles, such as ambulances. Motorized lifts have also been used on loading docks and trucks to allow cargo to be loaded, unloaded or otherwise moved.

When an access system is installed in a vehicle, it is generally integrated with the power sliding door system of the vehicle. The power sliding door system opens or closes the door when it receives a request to do so (a "door operation request"). The power sliding door system further includes a body control unit, door control unit, receiver, door switch and data bus. The body control unit, door control unit, receiver and door switch are all in communication with the vehicle's data bus, which enables body control unit, door control unit, receiver and door switch to communicate with each other and to receive a signal from a user indicating that the user wants to open or close the door (a "door operation request"). Generally, the user may communicate a door operation request to the power system door system by pulling on a door handle of the vehicle or pushing a button on a keyless entry device. If the door operation request is produced by a remote device, the power sliding door system receives the door operation request via the receiver. If the door operation request is produced by movement of the door handle, the door operation request causes the door switch to close, which communicates the door operation request to the power sliding door system.

When a door operation request received by the power sliding door system, it is initially received by the body control unit. The body control unit evaluates whether it is an appropriate time to operate the door. For example, the body control unit may receive signals via the data bus indicating the status of the transmission position, speed and door lock position of the vehicle. If the body control unit determines that the status of the vehicle are acceptable, the body control unit communicates a command to operate the door (a "door operation command") to the motors and switches that unlatch the door and either open or close the door.

Access systems are installed in vehicles with a power sliding door system as described above, so that the operation of the ramp by the access system and operation of the door by the power sliding door system do not interfere with each other. To prevent such interference, the access system may be installed so that it receives the door operation commands from the body control unit. The access system will only communicate the door operation command when it determines that the ramp is fully stowed. This method requires the access system to be in communication with the data bus of the power sliding door system, either directly or through a gateway. However, vehicle manufacturers are becoming less willing to allow access systems to communicate with the data bus and thus, unwilling to allow access systems to be installed and operate in the manner described above.

SUMMARY

An interface system is presented, which prevents operational interference between a vehicle power door and a ramp of an access system by interrupting power to the motors and actuators responsible for operating the door. The interface system includes a relay system that does not interrupt, read, signal, or otherwise interfere with the communication lines between a body control unit, door control unit, or remote control transmitter or receiver. Thus, the interface system functions without the need to receive and transmit signals on the vehicle's communication bus. The interface system enables the ramp controller of the access system to be a separate module, which controls the ramp and kneel functions, because the only input the ramp controller provides to the power door system is to a ground signal that mimics that of a switch included in the vehicle.

BRIEF DESCRIPTION OF THE DRAWINGS

The invention can be better understood with reference to the following drawings and description. The components in the figures are not necessarily to scale, emphasis instead being placed upon illustrating the principles of the invention. In the figures, the same reference symbols designate the same parts, components, modules or steps, unless and to the extent indicated otherwise.

DETAILED DESCRIPTION

Figure 1:
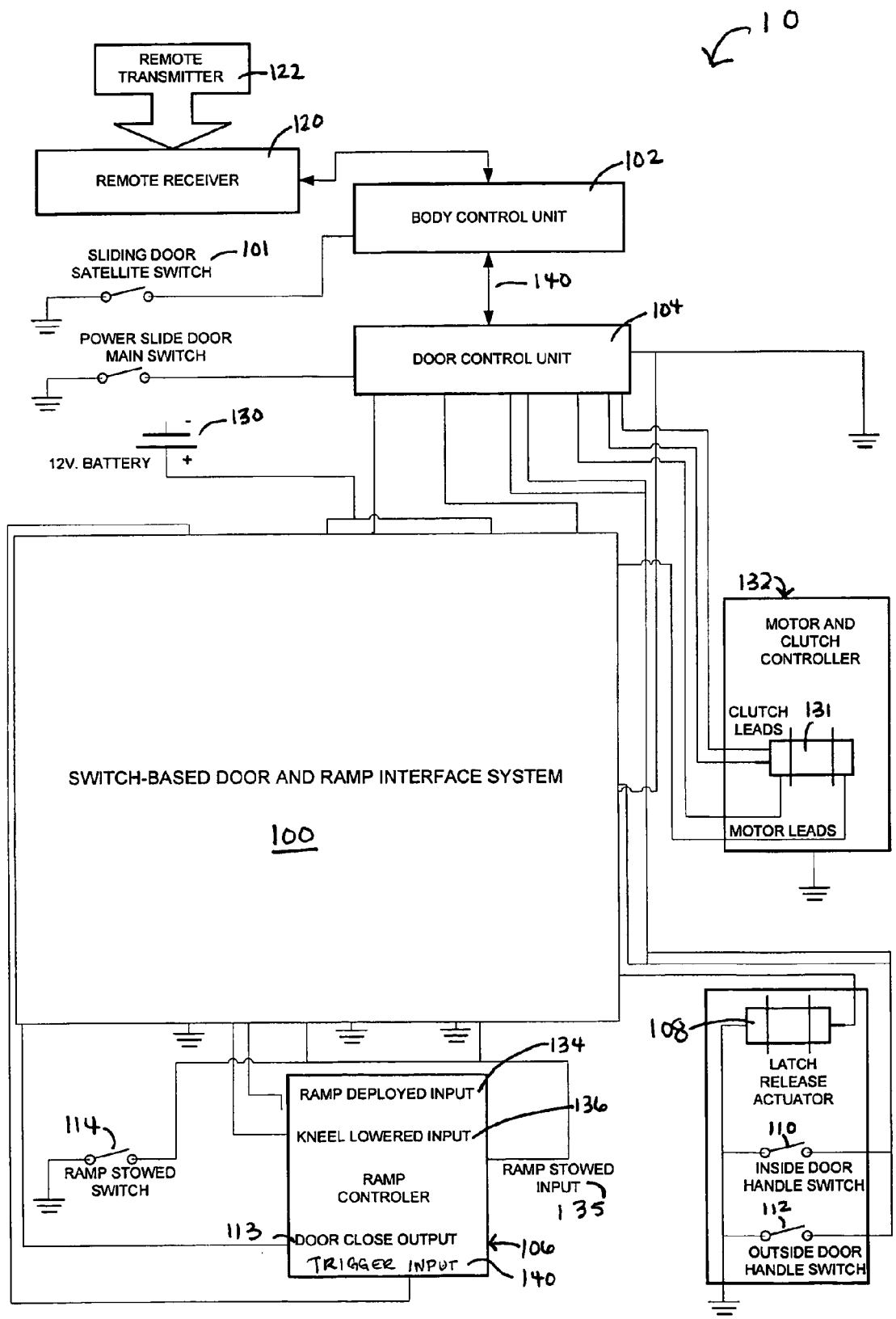
FIG. 1 is a block diagram of a switch-based interface system as implemented between a power sliding door system and a ramp controller.

FIG. 1 illustrates a switch-based door and ramp interface system (an "interface system") 100 as implemented in a vehicle so as to prevent operational interference between a ramp of an access system (controlled by a control system 106) and the door of the vehicle (controlled by a door control unit 104). The door control unit 104 opens and closes the door of the vehicle upon receiving a request from a user to do so, and is generally installed in the vehicle by the manufacturer of the vehicle. The ramp control system 106 and the remainder of the access system (not shown) deploys and stows a ramp to provide an alternative path for entering and exiting the vehicle. Unlike the door control unit 104, ramp control system 106 and the remainder of the access system (not shown) is generally installed by a third party after the vehicle has been manufactured. Therefore, it is unlikely that the door control unit includes a mechanism that will prevent operational interference between the door and the ramp. As a result, the interface system 100 is generally installed in the vehicle with the access system.

Figure 2:
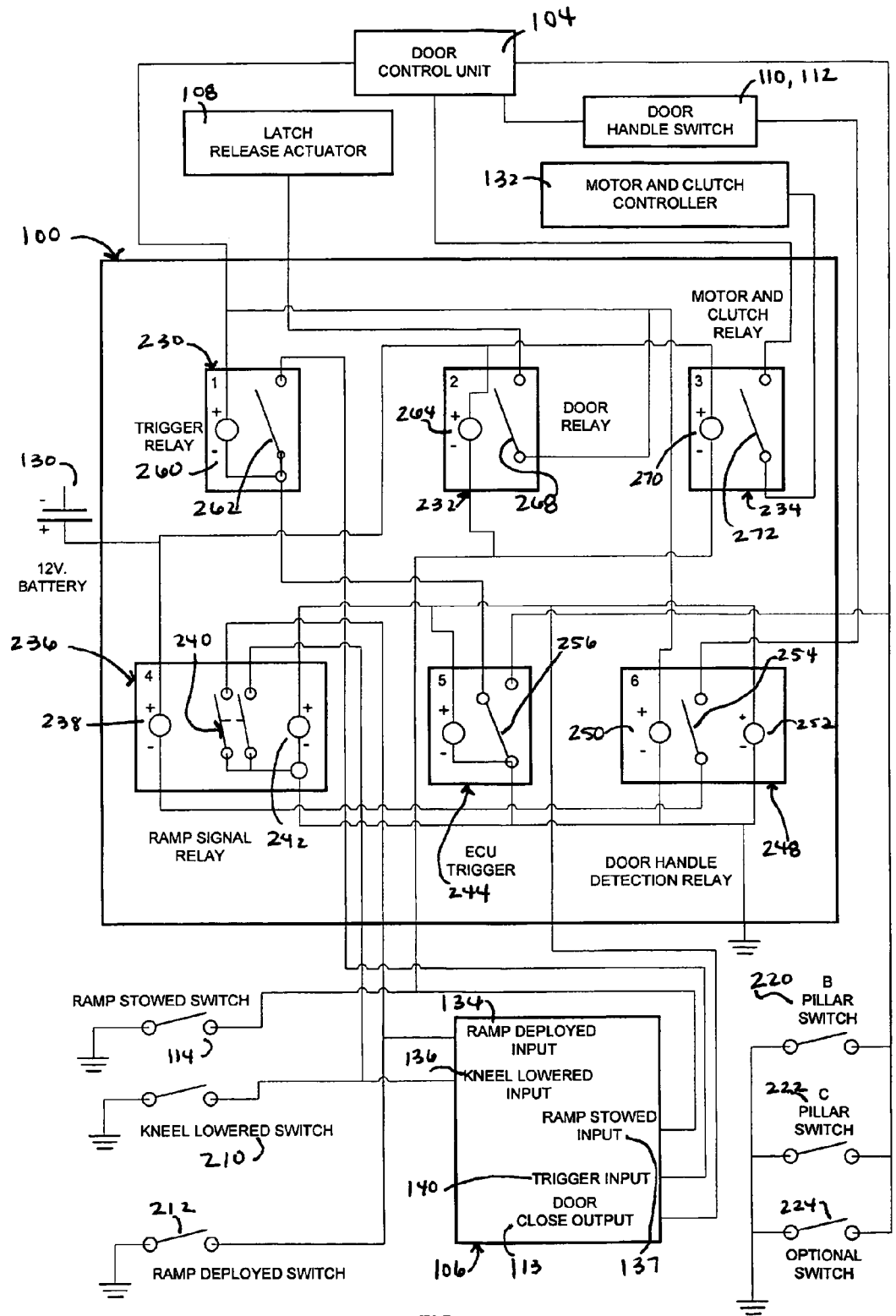
FIG. 2 is a circuit diagram of a switch-based interface system.

The interface system 100 prevents operational interference between the ramp and the door by interrupting power communicated by the door control unit 104 to the controllers that operate the motors and switches responsible for opening and closing the door when the ramp is not fully stowed. The interface system 100 does not communicate with the data bus 140 nor does it receive any control signals from the body control unit 104. As shown in FIG. 2, the interface system 100 includes a group of relays 230, 232, 234, 236, 244 and 248 that control operation of the door. Alternately, the interference system 100 may include transistors. As shown in FIG. 1, the interface system 100 is implemented between the door control unit 104 and the latch release actuator 108, and between the door control unit 104 and the motor and clutch controller 132, which actually moves the door. The latch release actuator 108 unlatches the door from the frame of the vehicle so that the door is free to move. The motor and clutch controller 132 then moves the door. Therefore, by interrupting the power to the latch release actuator 108 and the motor and clutch controller 132, interface system 100 prevents operation of the door.

The interface system 100 interrupts the power to the latch release actuator 108 and the motor and clutch controller 132 when a door operation request is received by the door control unit 104 and the ramp is not fully stowed. As shown in FIG. 2, the interface system 100 includes a door relay 232 and a motor and clutch relay 234. The door relay 232 is coupled between the door control unit 104 and the latch release actuator 108. The motor and clutch relay 234 is coupled between the door control unit 104 and the motor and clutch controller 132. The switch 268 of the door relay 232 remains open until the coil 264 is activate. Therefore, when the door control unit 104 communicates a power signal, the power signal will be interrupted by the door relay 232. Similarly, the switch 272 of the motor and clutch relay 234 remains open until the coil 270 is activated. The coils 264 and 270 are activated when the ramp is stowed. When the ramp is no longer fully stowed, the ramp stowed switch 114 will open, causing the coils 264 and 270 to deactivate and the switches 268 and 272, respectively, to open. Thus, the power to the latch release actuator 108 and motor and clutch controller 132 are interrupted.

The interface system 100 controls the power to the latch release actuator 108 and motor and clutch controller 132 as described above when the door operation request is communicated with the door control unit 104 by the body control unit 102 (FIG. 1). Although the door control unit 104 contains software and hardware that controls the proper operation of the door latches and motors, the door control unit 104 needs to receive authorization from the body control unit 102 before communicating a door operation command. The door control unit 104 authorizes the door control unit 104 by communicating door operation requests to the body control unit 102 when certain conditions are met. For example, the body operation function may monitor several switches mounted at various places inside the vehicle, which reflect conditions such as transmission position, vehicle speed, and door lock condition. These switches are tied to chassis ground and when depressed send a ground (low) signal to the body control unit 102. If the body control unit 102 determines that the conditions are met, it then sends a door operation request to the door control unit 104.

The body control unit 102 may receive a door operation request from a sliding door satellite switch 101. Alternately or additionally, the body control unit 102 may receive a door operation request from a remote transmitter 122 via a remote receiver 120 (which may be located inside the vehicle) and a data bus. The remote transmitter 122 may enable keyless entry into the vehicle by communicating a door operation request to the body control unit 102. The remote transmitter 122 may include a button, be mounted on a keychain and may issue a door operation request when the button is pushed.

However, if the door operation request is communicated with the door control unit 104 without going through the body control unit 102 first, the interface system 100 may control the power from the door control unit 102 in a different manner. Such door operation requests may originate from a pillar switch (such as B pillar switch 220, C pillar switch 222) an optional switch 224, the vehicle's inside door handle 110 or the vehicle's outside vehicle door handle 112. As shown in FIG. 1, when a pillar switch 220, 222, optional switch 224 or door handle switch 110, 112 is activated, it sends a ground (low) signal to the door control unit 104, bypassing the body control unit 102.

For the sake of example only, the following will discuss operation of the interface system 100 when the outside door handle switch 112 is activated. The discussion that follows applies when the inside door handle switch 110, pillar switch 220, 222 or optional switch 224 is activated.

When the outside door handle is activated by, for example, a user entering the vehicle who does not wish to use the ramp, the outside door handle switch 112 is closed, thus communicating a door operate command to the door control unit 104. However, under these conditions, the ramp interface system 100 may prevent the ramp from deploying and the vehicle from kneeling to prevent the ramp from hitting the user on the head. To allow the door to open and prevent the ramp from deploying, the interface system includes a door handle detection relay 248 and a ramp signal relay 236 that recognize this situation and control the ramp and kneeling under this situation. In general, if the door handle detection relay 248 and the ramp signal relay 236 detect that a door control request has been sent to the door control unit 104, the two relays 248 and 236 send signals to the ramp controller 106 indicating that the ramp and kneel are already deployed and lowered, respectively. Because the ramp controller 106 detects that the ramp is deployed and the vehicle kneeled, the ramp controller 106 will not deploy the ramp.

Upon receiving the door operation command from the outside door handle switch 112, the door control unit 104 may send power to the latch release actuator 108 and to a trigger relay 106, thus activating the trigger relay 106. The activated trigger relay 106 communicates a ground signal to the ramp controller 206, which activates the ramp controller 106. If the ramp is deployed, the ground signal causes the ramp to stow. When the ramp is fully stowed, the ramp stowed switch 114 closes, which communicates a ground signal to the door control unit 104 to repeat the process in order to close the door. If the ramp is stowed when the door control unit 104 sends power to the motor and clutch controller 132, the door closes.

If the door is closed when the outside door handle 112 is operated, the door will start to open. The ramp controller 106 includes a sensor that communicates a signal to the ramp controller 106 when the door is active, which prompts the ramp controller 106 to activate as well. However, the door handle detection relay 248 is also activated which sends a ground signal to the ramp signal relay 236. The ramp signal relay 236 communicates a ground signal to the ramp deployed input 134 and the kneel lowered input 136 of the ramp controller 106 so that the ramp controller senses that the ramp is deployed and the vehicle is lowered (kneeled), even though they are not. Thus, when the door is fully open, the ramp controller 106 will not deploy the ramp.

The door close output 113 of the ramp controller 106 is communicated to activate the ECU trigger 244. The ECU trigger 244, when activated, sends a ground (low) signal that duplicates the B pillar switch. This ground signal is transmitted to the OEM door control unit 104 which interprets this signal as a request to operate the power slide door from the B Pillar switch 220. The ramp controller 106 only communicates out this ground signal once it senses that the ramp is fully stowed. Because the ramp is fully stowed, the door relay 232 and the motor and clutch relay 234 are closed, thus, a new request from any switch will cause the door to close.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A control system for providing wheelchair access to a vehicle, the vehicle having a door and a ramp, the system comprising:
   a door motor operable to move the door between an opened position and a closed position;
   a ramp controller operable to move the ramp between a stowed position and a deployed position;
   a door control unit operable to control a supply of electrical power to the door motor in response to a door operation request;
   a power line coupled between the door control unit and the door motor to carry the supply of electrical power to the door motor; and
   an access controller coupled to the ramp controller and the power line, the access controller operable to selectively prohibit the supply of electrical power from reaching the door motor when the ramp is deployed.

2. The system of claim 1, wherein the access controller includes a door motor relay coupled to the power line between the door control unit and the door motor, and wherein the door motor relay is closed when the ramp is in the stowed position, and opened when the ramp is not in the stowed position, thereby preventing operation of the door motor when the ramp is not in the stowed position.

3. The system of claim 1, further comprising a door latch, a door latch actuator operable to latch and release the door latch, and an actuator power line coupled between the door control unit and the door latch actuator, the door latch actuator operating to latch and release the door latch in response to a power signal on the actuator power line.

4. The system of claim 3, wherein the access controller includes a door latch relay coupled to the actuator power line between the door control unit and the door latch actuator, and wherein the door latch relay is closed when the ramp is in the stowed position, and opened when the ramp is not in the stowed position, thereby preventing operation of the door latch actuator when the ramp is not in the stowed position.

5. The system of claim 1, wherein the access controller includes a door control unit relay, and wherein in response to the ramp actuator moving the ramp to the stowed position, the door control unit relay is operable to send the door operation request to the door control unit.

6. The system of claim 1, further comprising a body control unit coupled to the door control unit and operable to send the door operation request.

7. The system of claim 6, further comprising a data bus coupling the body control unit and the door control unit and affording communication between the body control unit and the door control unit.

8. The system of claim 6, further comprising:
   a remote receiver coupled to the body control unit and operable to send the door operation request;
   a door satellite switch coupled to the body control unit and operable to send the door operation request;
   a door main switch coupled to the door control unit and operable to send the door operation request; and
   a door handle switch coupled to the access controller and the door control unit and operable to send the door operation request.

9. The system of claim 8, wherein in response to receiving the door operation request from one of the remote receiver, the door satellite switch and the door main switch, the door control unit and the access controller operate to open the door, and the access controller subsequently instructs the ramp controller to deploy the ramp, and wherein in response to receiving the door operation request from the door handle switch, the door control unit and the access controller operate to open the door, but the access controller does not subsequently instruct the ramp actuator to deploy the ramp.

10. The system of claim 1, further comprising a trigger relay coupled to the ramp controller and the door control unit and operable to detect the door operation request, and wherein in response to detecting the door operation request when the ramp is deployed and the door is opened, the trigger relay communicates a signal to the ramp controller instructing the ramp controller to stow the ramp.

11. An access system for a vehicle having a door and a ramp, the access system comprising:
    a body control unit;
    a door control unit operable in response to commands received from the body control unit;
    a door motor operable in response to electrical power supplied by the door control unit to move the door between opened and closed positions;
    a power line coupled between the door control unit and the door motor for carrying the electrical power supplied by the door control unit;
    a ramp system operable to move the ramp between a stowed position and a deployed position; and
    an access controller coupled to the ramp system and including a motor switch connected to the power line between the door control unit and the door motor, the access controller operable to close the motor switch when the ramp is in the stowed position to allow operation of the door motor, and operable to open the motor switch when the ramp is not in the stowed position to prohibit operation of the door motor.

12. The system of claim 11, wherein the motor switch is connected to the power line in series between the door control unit and the door motor.

13. The system of claim 12, further comprising a door latch, a door latch actuator, and an actuator power line coupled between the door control unit and the door latch actuator for carrying an actuator electrical power supply from the door control unit to the door latch actuator.

14. The system of claim 13, wherein the access controller includes an actuator relay coupled to the actuator power line between the door control unit and the door latch actuator, and wherein the actuator relay is closed when the ramp is in the stowed position, and opened when the ramp is not in the stowed position, thereby preventing operation of the door latch actuator when the ramp is not in the stowed position.

15. The system of claim 11, wherein the access controller includes a door control unit relay, and wherein in response to the ramp system moving the ramp to the stowed position, the door control unit relay is operable to send a door operation request to the door control unit.

16. The system of claim 11, further comprising a data bus coupling the body control unit and the door control unit and affording communication between the body control unit and the door control unit.

17. The system of claim 11, further comprising:
    a remote receiver coupled to the body control unit and operable to send a door operation request;
    a door satellite switch coupled to the body control unit and operable to send the door operation request;
    a door main switch coupled to the door control unit and operable to send the door operation request; and a door handle switch coupled to the access controller and the door control unit and operable to send the door operation request.

18. The system of claim 17, wherein in response to receiving the door operation request from one of the remote receiver, the door satellite switch, and the door main switch, the door control unit and the access controller operate to open the door and subsequently deploy the ramp, and wherein in response to receiving the door operation request from the door handle switch, the door control unit and the access controller operate to open the door, but do not operate to deploy the ramp.

19. The system of claim 11, further comprising a trigger relay coupled to the ramp system and the door control unit and operable to receive a door operation request from the door control unit, and wherein in response to receiving the door operation request when the ramp is deployed and the door is opened, the trigger relay communicates a signal to the ramp system instructing the ramp system to stow the ramp.

20. A method of controlling a door system and a ramp system in a vehicle having a ramp, the method comprising:
    selecting a vehicle with an OEM door operation system including a door control unit and a door motor, the door control unit operable to provide a supply of electrical power to the door motor;
    installing an access controller in the vehicle;
    coupling the access controller to the door operation system between the door control unit and the door motor; and,
    coupling the access controller to the ramp system, wherein the access controller prevents the supply of electrical power from reaching the door motor when the ramp is in a deployed position.

21. The method of claim 20, wherein the access controller creates an open circuit on a power line that extends between the door control unit and the door motor to prevent the supply of electrical power from reaching the door motor when the ramp is in a deployed position.

22. The method of claim 20, wherein the access controller allows the supply of electrical power to reach the door motor when the ramp is in a stowed position.

23. The method of claim 20, wherein the access controller creates a closed circuit on a power line that extends between the door control unit and the door motor to allow the supply of electrical power to reach the door motor when the ramp is in a stowed position.

24. The method of claim 20, wherein installing the access controller includes coupling the access controller to a ramp stowed switch that changes state in response to the ramp moving away from a stowed position, and wherein the access controller prevents the supply of electrical power from reaching the door motor in response to a change in state of the ramp stowed switch.

25. The method of claim 20, wherein the access controller includes a trigger relay, the method further comprising:
    coupling the trigger relay to the ramp system and to the door control unit, wherein the trigger relay receives a door operation request from the door control when the ramp is deployed and the door is opened, and wherein in response to receiving the door operation request from the door control unit, the trigger relay communicates a signal for stowing the ramp to the ramp system.

26. The method of claim 20, wherein the door control unit operates to provide the supply of electrical power to the door motor in response to receiving door operation requests, the method further comprising operating the door system and the ramp system to stow the ramp and close a door, wherein operating the door system and the ramp system to stow the ramp and close the door comprises:
    sending a first door operation request from an OEM door operation switch;
    operating the door control unit to provide the supply of electrical power to the door motor;
    overriding the door control unit with the access controller by preventing the supply of electrical power from reaching the door motor, thereby preventing movement of the door;
    operating the ramp system to stow the ramp;
    sending a second door operation request to the door control unit from the access controller after the ramp is fully stowed; and
    allowing the supply of electrical power to reach the door motor for movement of the door after the ramp is stowed.

* * * * *